United States Patent
Schiro'

(10) Patent No.: US 12,485,951 B2
(45) Date of Patent: Dec. 2, 2025

(54) STEERING COLUMN FOR ROAD VEHICLES

(71) Applicant: FERRARI S.P.A., Modena (IT)

(72) Inventor: Lorenzo Schiro', Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/987,414

(22) Filed: Dec. 19, 2024

(65) Prior Publication Data

US 2025/0206367 A1 Jun. 26, 2025

(30) Foreign Application Priority Data

Dec. 22, 2023 (IT) .......................... 102023000027870

(51) Int. Cl.
*B62D 1/185* (2006.01)

(52) U.S. Cl.
CPC .................................... *B62D 1/185* (2013.01)

(58) Field of Classification Search
CPC ...................................................... B62D 1/185
See application file for complete search history.

(56) References Cited

U.S. PATENT DOCUMENTS

| | | | | |
|---|---|---|---|---|
| 4,826,466 | A * | 5/1989 | Triquet | F16D 3/845 |
| | | | | 403/50 |
| 6,808,207 | B2 * | 10/2004 | Nakano | B60R 22/1952 |
| | | | | 297/480 |
| 11,679,798 | B2 * | 6/2023 | Kreutz | B62D 1/183 |
| | | | | 280/775 |
| 12,024,240 | B2 * | 7/2024 | Bayer | B62D 5/006 |
| 2021/0124349 | A1 * | 4/2021 | Koehler | B62D 1/185 |
| 2022/0227410 | A1 | 7/2022 | Kremer et al. | |
| 2022/0274639 | A1 | 9/2022 | Park et al. | |

FOREIGN PATENT DOCUMENTS

| | | | | |
|---|---|---|---|---|
| DE | 19644170 A1 | * | 4/1998 | ............ B60R 13/02 |
| DE | 10130931 C1 | * | 8/2002 | ........ B60R 13/0256 |
| DE | 102019217279 A1 | * | 5/2021 | ............ B62D 1/181 |
| DE | 102020111495 A1 | | 10/2021 | |
| DE | 102022205275 B3 | * | 12/2022 | |
| EP | 3083368 A1 | | 10/2016 | |
| FR | 3106116 A1 | * | 7/2021 | ........ B60R 13/0256 |
| KR | 20210059982 A | * | 5/2021 | |
| WO | WO-2021224200 A1 | * | 11/2021 | ............ B62D 1/181 |

OTHER PUBLICATIONS

Italian International Search Report and Written Opinion in IT Application No. 202300027870 mailed Jul. 5, 2024, an English translation attached herewith. (8 pages).

* cited by examiner

*Primary Examiner* — Drew J Brown
(74) *Attorney, Agent, or Firm* — Leason Ellis LLP

(57) ABSTRACT

A steering column for road vehicles having a steering shaft; a transmission shaft, which is housed in the steering shaft, is provided with a steering wheel and has an upper segment, which projects out of, and is coupled in a rotary and axially sliding manner to an upper post of the steering shaft; and a covering device to cover at least part of the upper post of the steering shaft with at least two sleeves, which are connected one to a dashboard of a road vehicle and one to the steering wheel, and are coupled to one another in a sliding manner so as to move between an extracted position and a retracted position.

11 Claims, 5 Drawing Sheets

STEERING COLUMN FOR ROAD VEHICLES

CROSS-REFERENCE TO RELATED APPLICATIONS

This patent application claims priority from Italian patent application no. 102023000027870 filed on Dec. 22, 2023, the entire disclosure of which is incorporated herein by reference.

TECHNICAL FIELD

The present invention relates to a steering column for road vehicles.

BACKGROUND

In particular, the present invention relates to a steering column of the type comprising a steering shaft having an upper post; and a transmission shaft, which is housed in the steering shaft, and has an upper segment, which projects out of the upper post, is provided with a steering wheel so as to allow the driver to selectively control a forward moving direction of the vehicle, and is coupled in a rotary and axially sliding manner to the upper post.

The upper segment of the transmission shaft sliding along the upper post of the steering shaft allows the driver to adjust in an ergonomic manner the position of the steering wheel with respect to a dashboard and to a control panel of the road vehicle.

The steering column further comprises a gearbox control assembly fixed on the upper segment of the transmission shaft between the control panel and the steering wheel; and a covering device for at least part of the upper post of the steering shaft.

Generally, the covering device comprises a sleeve made of plastic material or fabric extending around the upper post of the steering shaft.

The known steering columns of the type described above have some drawbacks mainly originating from the fact that the covering device has relatively high dimensions and has a relatively reduced and limited capacity to cover the upper post of the steering shaft.

SUMMARY

The object of the present invention is to provide a steering column for road vehicles which is free from the drawbacks set forth above and which is simple and cost-effective to manufacture.

According to the present invention, a steering column for road vehicles is provided as claimed in the appended claims.

BRIEF DESCRIPTION OF THE DRAWINGS

The present invention will now be described with reference to the accompanying drawings, which illustrate a non-limiting embodiment example thereof, wherein.

DESCRIPTION OF EMBODIMENTS

Figure 1:
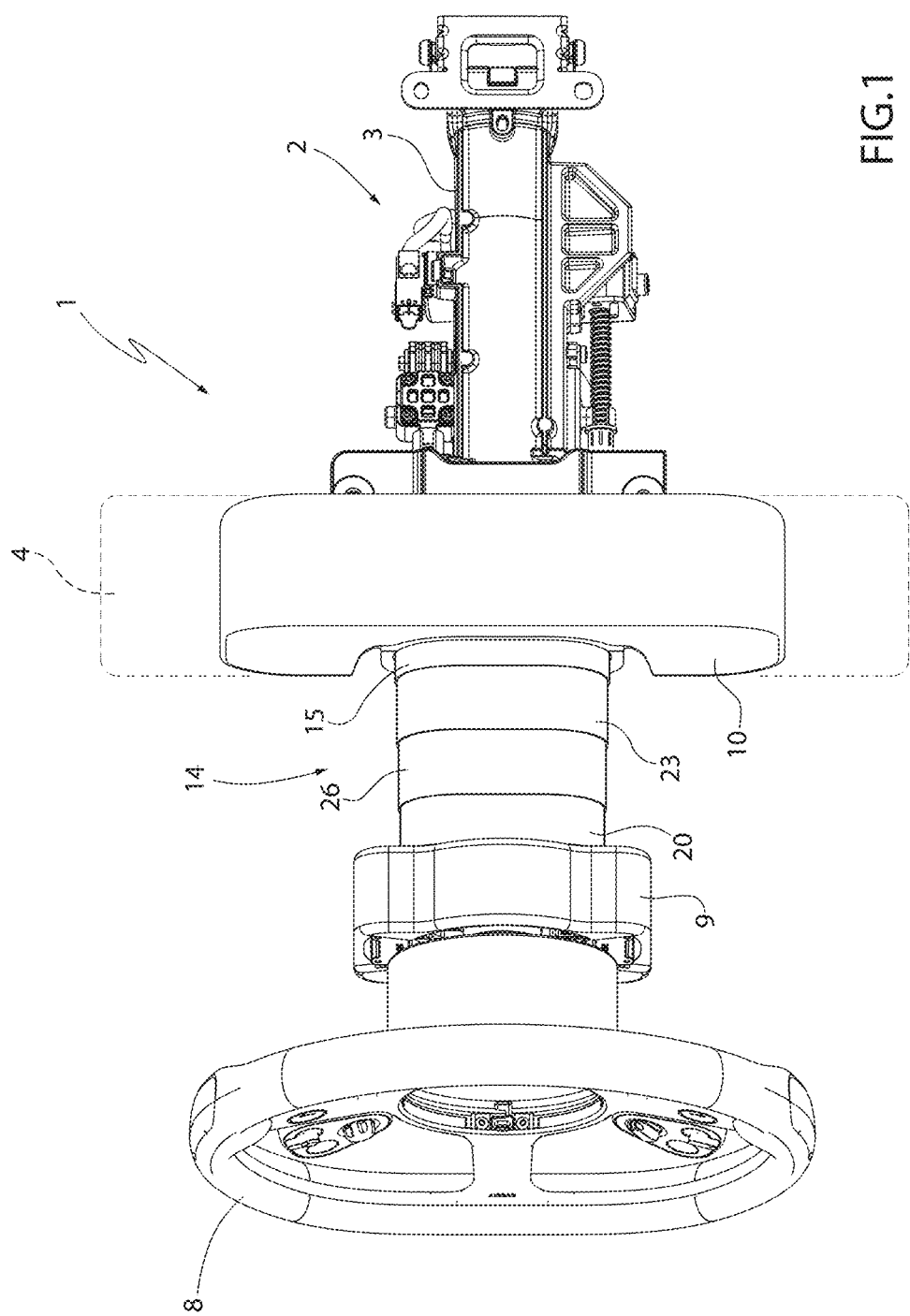
FIGS. 1, 2, and 3 are three schematic perspective views, with parts removed for the sake of clarity, of a preferred embodiment of the steering column of the present invention shown in three different operating positions.
Figure 2:
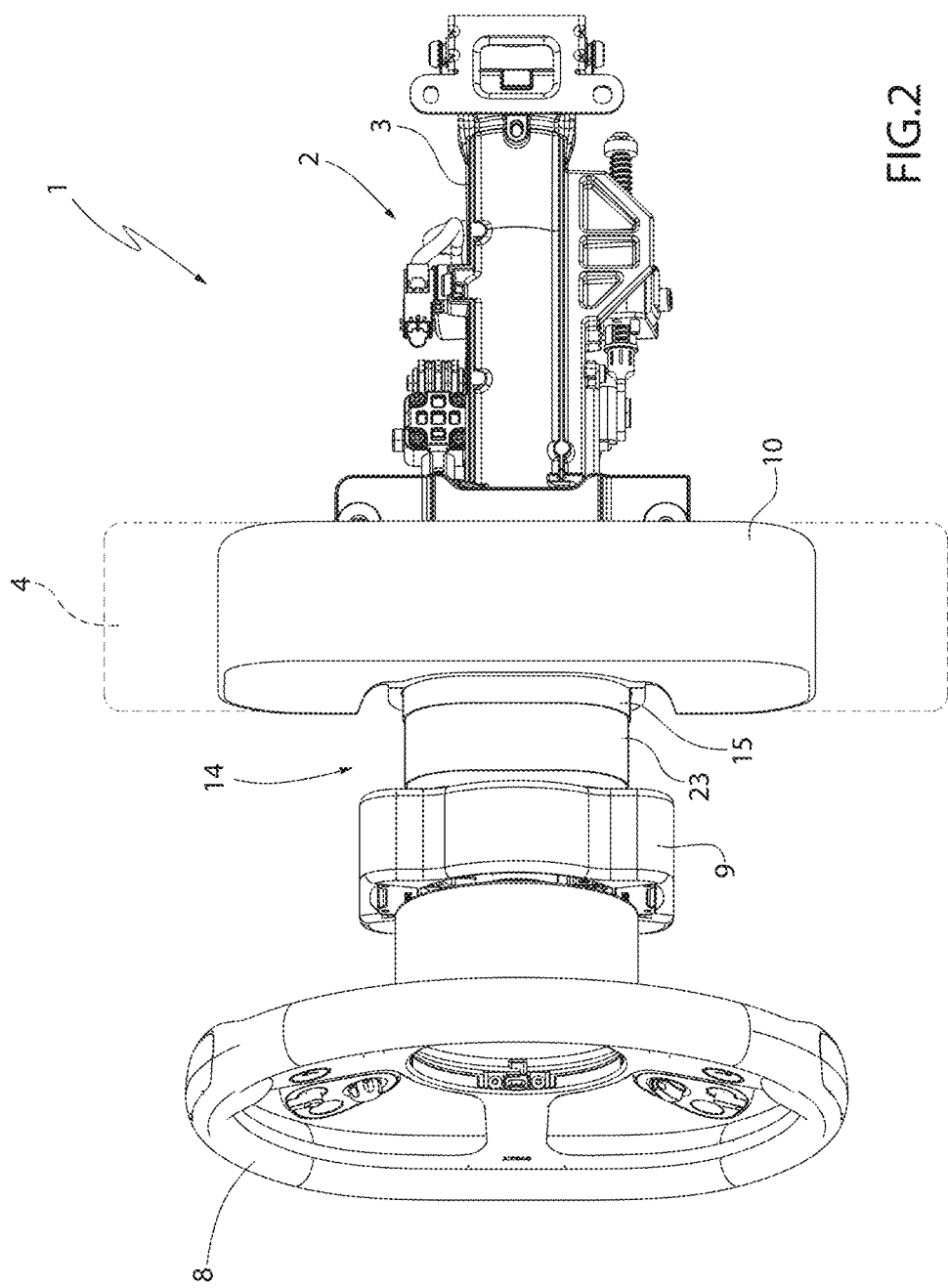
Figure 3:
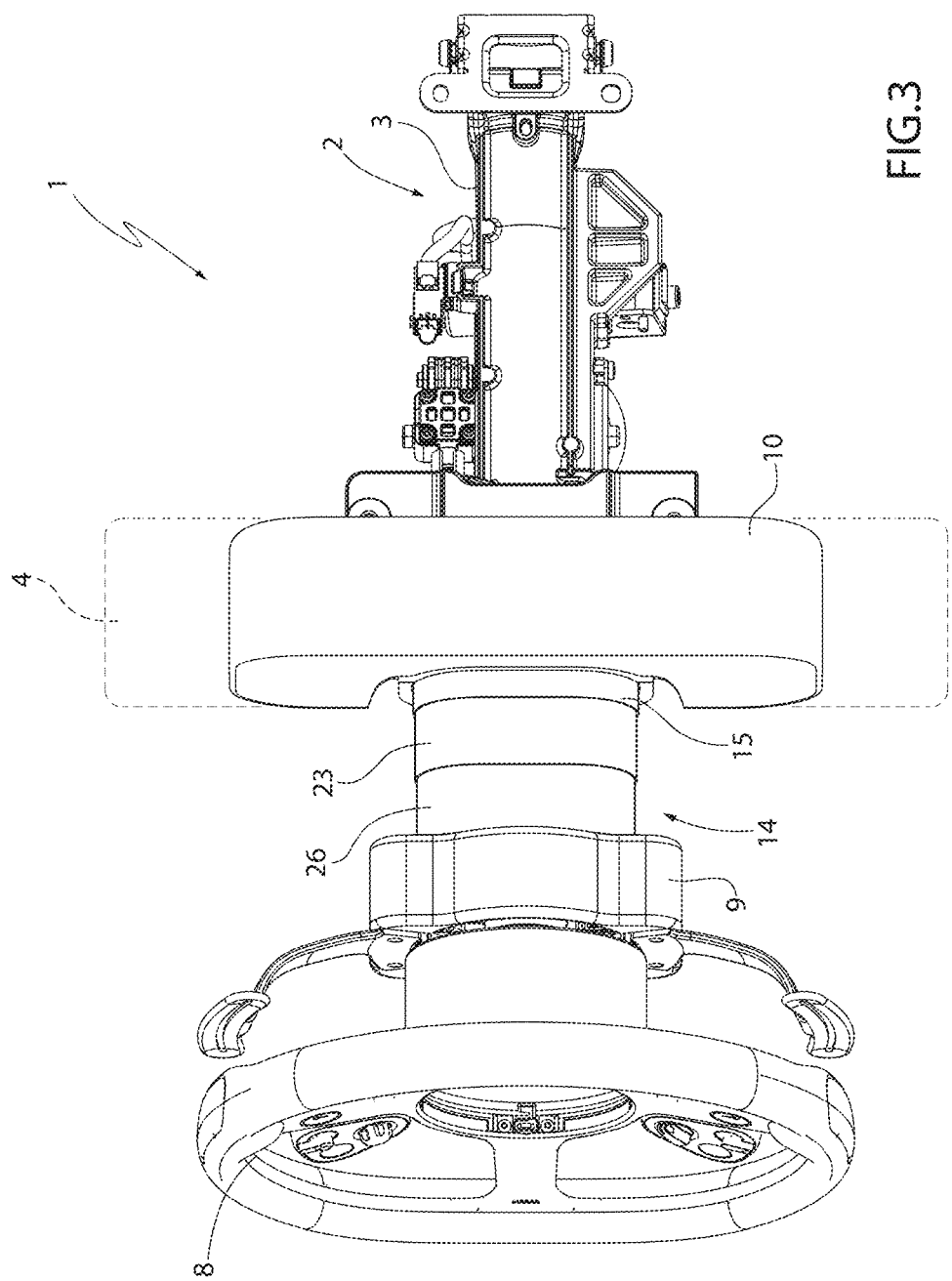
Figure 4:
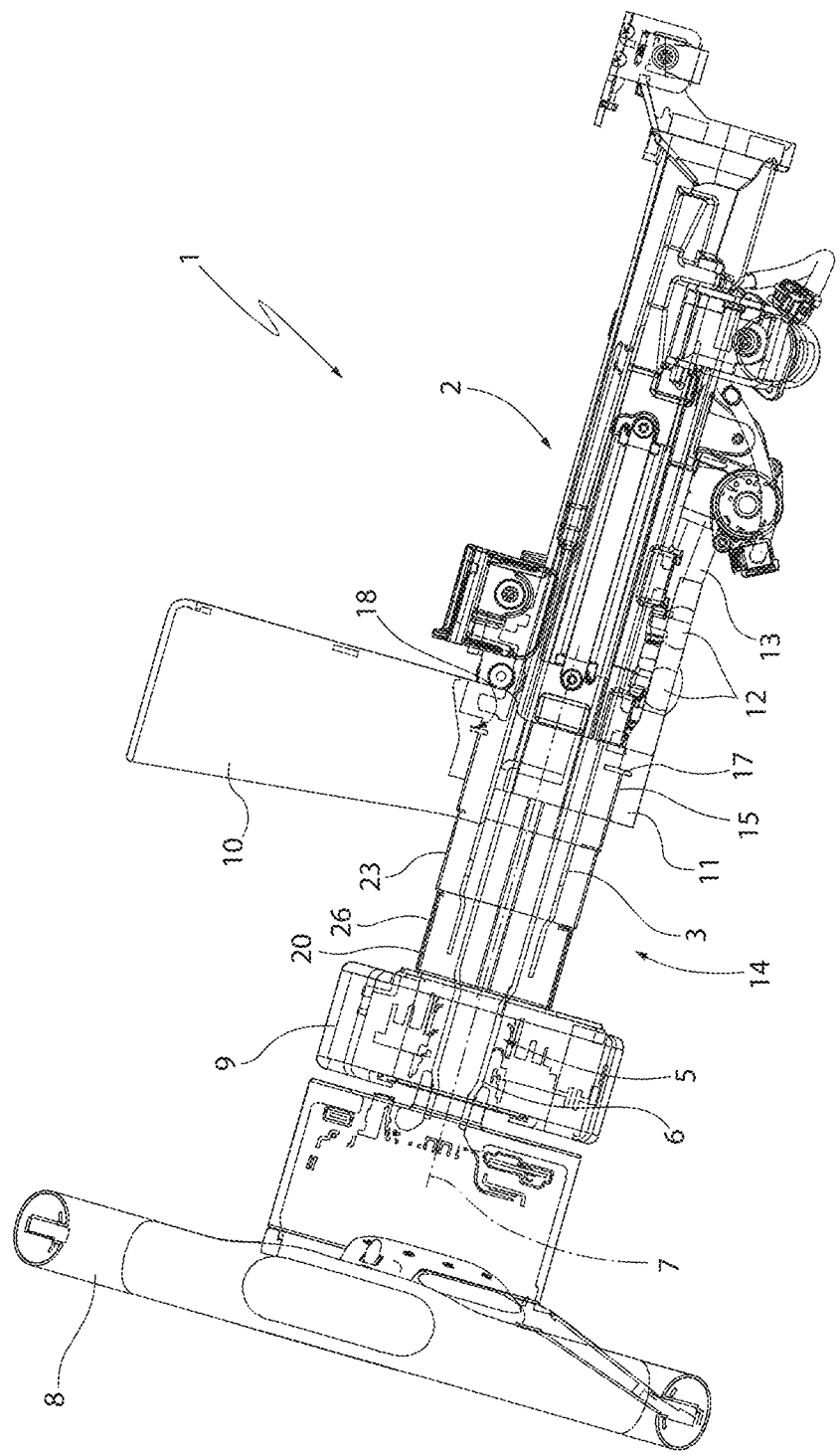
FIG. 4 shows a schematic side view, with parts in section and parts removed for the sake of clarity, of a detail of the steering column of FIGS. 1, 2, and 3.
Figure 5:
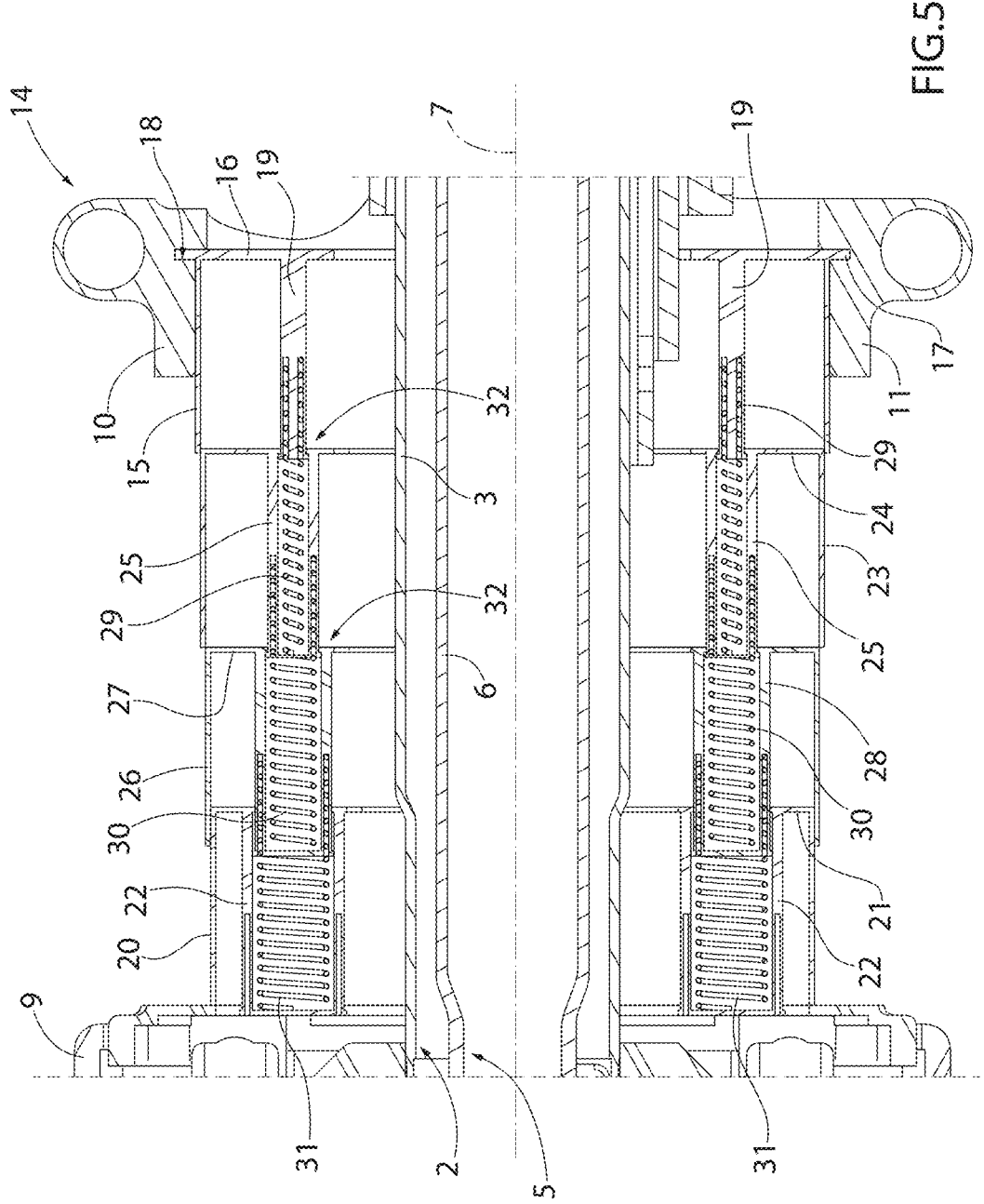
FIG. 5 is a schematic side view, with parts in section and parts removed for the sake of clarity, of a detail of FIG. 4.

Referring to FIGS. 1, 2, 3, 4, and 5, the reference numeral 1 indicates, as a whole, a steering column for road vehicles comprising a steering shaft 2, which is configured to be connected to a body (not shown) of a road vehicle (not shown), and comprises, in turn, an upper post 3 projecting inside a passenger compartment (not shown) of the road vehicle (not shown) from a dashboard 4.

The steering column 1 further comprises a transmission shaft 5 comprising, in turn, an upper segment 6, which extends inside the post 3, is mounted to rotate around a rotation axis 7, and is coupled in a sliding manner to the segment 6 to perform rectilinear movements along the shaft 2.

The segment 6 projects out of the post 3, carries a steering wheel 8 connected at a free end thereof, and further supports a gearbox control assembly 9 of the known type mounted between the dashboard 4 and the steering wheel 8.

The steering column 1 is further associated with a control panel 10, which projects upwards from the post 3, and is locked on the shaft 2 by means of a fixing fork 11 mounted below the post 3.

In this case, the assembly defined by the post 3, by the segment 6, by the steering wheel 8, by the gearbox control assembly 9, and by the control panel 10, is coupled in a rotary manner to the dashboard 4 by means of a plurality of ball joints 12 obtained partly on a fastening plate 13 of the fork 11 and partly on the dashboard 4.

The steering column 1 is further provided with a covering device 14 for an end segment of the post 3.

The device 14 comprises a first sleeve 15, which extends around the post 3 coaxially to the axis 7, is limited by an annular-shaped bottom wall 16 substantially perpendicular to the axis 7, and is axially locked on the control panel 10 by engaging an annular flange 17 radially projecting outwards from the sleeve 15 into a recess 18 obtained partly on the control panel 10 and partly on the fork 11.

The sleeve 15 is provided with a plurality of cylindrical guides 19, which are uniformly distributed around the axis 7 and the post 3, and project from the wall 16 parallel to the axis 7.

The device 14 further comprises a second sleeve 20, which extends around the post 3, and is axially locked on the gearbox control assembly 9 by means of a plurality of fixing screws (not shown).

The sleeve 20 is limited by an annular-shaped bottom wall 21 substantially perpendicular to the axis 7, and is provided with a plurality of cylindrical guides 22, which are uniformly distributed around the axis 7 and the post 3, project from the wall 16 parallel to the axis 7, and are axially open at the wall 21.

In this case, the device 14 further comprises a third sleeve 23, which extends around the post 3, is limited by an annular-shaped bottom wall 24 substantially perpendicular to the axis 7, and is provided with a plurality of cylindrical guides 25.

The guides 25 are uniformly distributed around the axis 7 and the post 3, project from the wall 24 parallel to the axis 7, are axially open at the wall 24, and are coupled in a sliding manner to the guides 19 of the sleeve 15.

In this case, the device 14 further comprises a fourth sleeve 26, which extends around the post 3, is limited by an annular-shaped bottom wall 27 substantially perpendicular to the axis 7, and is provided with a plurality of cylindrical guides 28.

The guides 28 are uniformly distributed around the axis 7 and the post 3, project from the wall 27 parallel to the axis 7, are axially open at the wall 27, and are coupled in a sliding manner to the guides 22 of the sleeve 20 and to the guides 25 of the sleeve 23.

Obviously, the guides 19 are equal in number to the number of the guides 22, to the number of the guides 25, and to the number of the guides 28.

The sleeve 20 has a smaller cross section than the cross section of the sleeve 26 so as to move inside the sleeve 26; the sleeve 26 has a smaller cross section than the cross section of the sleeve 23 so as to move inside the sleeve 23; and the sleeve 23 has a smaller cross section than the cross section of the sleeve 15 so as to move inside the sleeve 15.

The device 14 further comprises a spring 29 interposed between each guide 19 of the sleeve 15 and the relative guide 25 of the sleeve 23, a spring 30 interposed between each guide 25 of the sleeve 23 and the relative guide 28 of the sleeve 26, and a spring 31 interposed between each guide 28 of the sleeve 26 and the relative guide 22 of the sleeve 20.

The sleeves 20, 23, 26 are moved by the springs 29, 30, 31 to an extracted position (FIG. 1), are movable to a retracted position (FIG. 2) against the bias of the springs 29, 30, 31, and are stopped in their extracted position by engaging respective pairs of limit stop flanges 32 obtained at the ends of the guides 19, 22, 25, 28.

With regard to what set forth above, it should be specified that the sleeves 15, 20, 23, 26 are made of a stiff material, in particular a plastic material.

According to some not shown variations:
the sleeves 23 and 26 are eliminated and the sleeves 15 and 20 are directly connected to one another;
the number of sleeves 23, 26 is different from two; and
the sleeve 15 and, therefore, the device 14 are not connected to the control panel 10 and are directly connected to the dashboard 4.

The steering column 1 has some advantages mainly originating from the fact that the covering device 14 has relatively reduced dimensions and a relatively high capacity to cover the upper post 3 of the shaft 2. In particular, the covering device 14 has, when arranged in its extracted position, a length, measured between the control panel 10 and the gearbox control assembly 9, at least of 120 mm.

The invention claimed is:

1. A steering column for road vehicles comprising a steering shaft having an upper post; a transmission shaft, which is housed in the steering shaft and has an upper segment, which projects out of the upper post, is provided with a steering wheel and is coupled to the upper post in a rotary and axially sliding manner; and a covering device for at least part of the upper post of the steering shaft;
wherein the covering device comprises at least a first sleeve and a second sleeve, which extend around the upper post of the steering shaft, are connected one to a dashboard of a road vehicle and one to the upper segment of the transmission shaft and are movable relative to one another between an extracted position and a retracted position;
wherein the first sleeve is connected to the dashboard through the interposition of a control panel of the road vehicle; and
wherein the first sleeve is fixed to the control panel and the control panel is fastened to the dashboard in a rotary manner.

2. The steering column according to claim 1, wherein said first and second sleeves have respective annular limit stop flanges to stop said first and second sleeves in their extracted position.

3. The steering column according to claim 1, wherein the covering device further comprises at least a third sleeve mounted between said first and second sleeves; said first, second and third sleeves being coupled to one another in a sliding manner so as to move between said retracted and extracted positions.

4. A steering column for road vehicles comprising a steering shaft having an upper post; a transmission shaft, which is housed in the steering shaft and has an upper segment, which projects out of the upper post, is provided with a steering wheel and is coupled to the upper post in a rotary and axially sliding manner; and a covering device for at least part of the upper post of the steering shaft;
wherein the covering device comprises at least a first sleeve and a second sleeve, which extend around the upper post of the steering shaft, are connected one to a dashboard of a road vehicle and one to the upper segment of the transmission shaft and are movable relative to one another between an extracted position and a retracted position; and
a gearbox control assembly fixed to the upper segment of the transmission shaft; the second sleeve being fastened to the gearbox control assembly.

5. A steering column for road vehicles comprising a steering shaft having an upper post; a transmission shaft, which is housed in the steering shaft and has an upper segment, which projects out of the upper post, is provided with a steering wheel and is coupled to the upper post in a rotary and axially sliding manner; and a covering device for at least part of the upper post of the steering shaft;
wherein the covering device comprises at least a first sleeve and a second sleeve, which extend around the upper post of the steering shaft, are connected one to a dashboard of a road vehicle and one to the upper segment of the transmission shaft and are movable relative to one another between an extracted position and a retracted position; and
wherein said first and second sleeves are coupled so as to slide relative to one another and the covering device further comprises at least one spring interposed between said first and second sleeves to move said first and second sleeves to their extracted position.

6. A steering column for road vehicles comprising a steering shaft having an upper post; a transmission shaft, which is housed in the steering shaft and has an upper segment, which projects out of the upper post, is provided with a steering wheel and is coupled to the upper post in a rotary and axially sliding manner; and a covering device for at least part of the upper post of the steering shaft;
wherein the covering device comprises at least a first sleeve and a second sleeve, which extend around the upper post of the steering shaft, are connected one to a dashboard of a road vehicle and one to the upper segment of the transmission shaft and are movable relative to one another between an extracted position and a retracted position; and
wherein the covering device further comprises at least a third sleeve mounted between said first and second sleeves; said first, second and third sleeves being coupled to one another in a sliding manner so as to move between said retracted and extracted positions;
wherein the covering device further comprises, for each pair of sleeves adjacent to one another, at least one respective spring interposed between the adjacent sleeves to move them to their extracted position.

7. The steering column according to claim 6, wherein each pair of sleeves (15, 20, 23, 26) adjacent to one another has a relative pair of annular limit stop flanges (32) to stop the adjacent sleeves (15, 20, 23, 26) in their extracted position.

8. The steering column according to claim 6, wherein said first sleeve, second sleeve and third sleeve are made of a stiff material.

9. The steering column according to claim 8, wherein said first sleeve, second sleeve and third sleeve are made of a plastic material.

10. The steering column according to claim 4, wherein the first sleeve is connected to the dashboard through the interposition of a control panel of the road vehicle.

11. The steering column according to claim 4, wherein said first and second sleeves have respective cross sections that are different from one another so as to move inside one another between said extracted and retracted positions.

* * * * *